(12) United States Patent
Mügge

(10) Patent No.: US 10,683,984 B2
(45) Date of Patent: Jun. 16, 2020

(54) ILLUMINATING DEVICE FOR VEHICLES

(71) Applicant: Hella GmbH & Co. KGaA, Lippstadt (DE)

(72) Inventor: Martin Mügge, Geseke (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 16/334,255

(22) PCT Filed: Sep. 13, 2017

(86) PCT No.: PCT/EP2017/072992
§ 371 (c)(1),
(2) Date: Mar. 18, 2019

(87) PCT Pub. No.: WO2018/054734
PCT Pub. Date: Mar. 29, 2018

(65) Prior Publication Data
US 2019/0264888 A1    Aug. 29, 2019

(30) Foreign Application Priority Data

Sep. 20, 2016 (DE) .......................... 10 2016 117 685

(51) Int. Cl.
*F21S 43/31* (2018.01)
*F21S 41/16* (2018.01)
(Continued)

(52) U.S. Cl.
CPC ............. *F21S 43/31* (2018.01); *F21S 41/141* (2018.01); *F21S 41/16* (2018.01); *F21S 41/337* (2018.01);
(Continued)

(58) Field of Classification Search
CPC .................................. G02B 5/32; F21S 43/40
See application file for complete search history.

(56) References Cited

U.S. PATENT DOCUMENTS

| 2016/0040846 A1* | 2/2016 | Yang | ........................ F21S 48/13 |
| 2016/0161913 A1* | 6/2016 | Yang | .................... G03H 1/2286 |
| | | | 359/28 |
| 2018/0142840 A1* | 5/2018 | Kurashige | ............... F21K 9/233 |

FOREIGN PATENT DOCUMENTS

| DE | 4421306 C2 | 12/1999 |
| DE | 102014218540 A1 | 3/2016 |

(Continued)

OTHER PUBLICATIONS

International Search Report and Written Opinion dated Dec. 8, 2017 from corresponding PCT Application.

*Primary Examiner* — Anh T Mai
*Assistant Examiner* — Zachary J Snyder
(74) *Attorney, Agent, or Firm* — Husch Blackwell LLP

(57) ABSTRACT

An illuminating device for vehicles with a housing in which an optical unit with a light source and an optical unit with a reflector and a hologram element are arranged to create a specified light diffusion. The hologram element runs at a right angle to a main radiation direction (H) in front of the illuminating device. The reflector is designed to be a deflecting reflector to deflect the light emitted at an obtuse angle (α) in the direction of the hologram element. The deflecting reflector is arranged outside of a horizontal plane that crosses one of the glare edges of the hologram element. The deflecting reflector is designed as a prism reflector that has a multitude of prism elements arranged in columns and/or rows.

10 Claims, 5 Drawing Sheets

(51) Int. Cl.
*F21S 43/14* (2018.01)
*F21S 41/141* (2018.01)
*F21S 41/33* (2018.01)
*F21S 43/15* (2018.01)
*G02B 5/32* (2006.01)
*G02B 5/122* (2006.01)
*G03H 1/30* (2006.01)
*F21S 43/20* (2018.01)
*G03H 1/00* (2006.01)
*F21S 43/40* (2018.01)
*F21W 103/10* (2018.01)
*F21W 103/35* (2018.01)
*F21W 103/55* (2018.01)
*G03H 1/22* (2006.01)

(52) U.S. Cl.
CPC ............... *F21S 43/14* (2018.01); *F21S 43/15* (2018.01); *F21S 43/26* (2018.01); *F21S 43/40* (2018.01); *G02B 5/122* (2013.01); *G02B 5/32* (2013.01); *G03H 1/0005* (2013.01); *G03H 1/30* (2013.01); *F21W 2103/10* (2018.01); *F21W 2103/35* (2018.01); *F21W 2103/55* (2018.01); *G03H 1/2202* (2013.01)

(56) References Cited

FOREIGN PATENT DOCUMENTS

| | | |
|---|---|---|
| EP | 364228 A2 | 4/1990 |
| EP | 766037 A1 | 4/1997 |
| EP | 1079171 A2 | 2/2001 |
| EP | 3032346 A1 | 6/2016 |
| JP | H09039653 A | 2/1997 |
| KR | 1020160062780 A | 6/2016 |
| KR | 1020160073741 A | 6/2016 |

\* cited by examiner

ILLUMINATING DEVICE FOR VEHICLES

CROSS REFERENCE

This application claims priority to PCT Application No. PCT/EP2017/072992, filed Sep. 13, 2017, which itself claims priority to German Patent Application 10 2016 117685.0, filed Sep. 20, 2016, the entirety of both of which are hereby incorporated by reference.

FIELD OF THE INVENTION

The invention involves an illuminating device for vehicles with a housing in which an optical unit with a light source and an optical unit with a reflector and a hologram element are arranged to create a specified light diffusion, where the hologram element runs at a right angle to a main radiation direction of the illuminating device.

BACKGROUND

An illuminating device for vehicles with a housing which is subdivided into multiple chambers is known from DE 44 21 306 C2. In each chamber, a light source and a reflector and a hologram element as an optical unit are arranged. The hologram element enables a desired visual effect which can for example be created through a stepped pattern. A disadvantage of previous illuminating devices is that when looking at the illuminating device, the reflector is arranged in the main radiation direction of the illuminating device behind the hologram element. To show the hologram created in a contrast-rich manner, it is desirable that the hologram element appears as dark or black as possible in the field of view. If there is a reflector behind the hologram element, then this is not possible. If, as shown in FIG. 9, the light source is arranged in a covered part of the lower part of the housing and the installation space for the illuminating device is limited in height and/or depth, then a reflector 3' can usually only be arranged in such a way that it is at least partially in the field of view of the viewer and is partially covered by a hologram element 4'.

SUMMARY OF THE INVENTION

Therefore, the purpose of this invention is to further develop an illuminating device for vehicles in such a way that a luminous and compact signal function with a reflector arranged in such a way that it is invisible to a viewer is ensured while also generating an expansion of the viewing angle range for the hologram element.

To solve this task, the invention is characterized by the fact that the reflector is designed to be a deflecting reflector to deflect the light emitted at an obtuse angle in the direction of the hologram element, where the deflecting reflector is arranged outside of a horizontal plane that crosses one of the glare edges of the hologram element and where the deflecting reflector is designed as a prism reflector that has a multitude of prism elements arranged in columns and/or rows.

According to the invention, a deflecting reflector which deflects a light emitted by a light source at an obtuse angle is designed as a prism reflector that has a multitude of prism elements arranged in columns and/or rows. Advantageously, the reflector can thereby be made relatively flat without limiting the luminous flux needed for the signal light function. Preferably, the light emitted by the light source is deflected in such a way that it hits the hologram element parallel below a certain angle. Advantageously, the deflecting reflector is arranged such that it is invisible to the viewer, because it is arranged entirely outside of the viewing range, which is delimited by the glare edges of the hologram element projecting onto a plane across from the main radiation direction. The deflecting reflector is therefore arranged outside of a horizontal plane which crosses one of the upper or lower glare edges of the hologram element. In addition, the deflecting reflector can be covered by a cover. This ensures that, since the deflecting reflector is arranged outside of the visibility range of the hologram element, there is a dark background and a higher contrast in how the hologram is displayed. Moreover, this achieves a space-saving arrangement of the reflector, which enables a hologram function to be implemented in a rear light or a headlight.

According to a preferred embodiment of the invention, the prism reflector has a level base upon which the multitude of prism elements are arranged. This allows the reflector to be designed to be relatively flat. It can be arranged in an edge area of the housing in a space-saving manner.

The base can run in the main radiation direction and/or at an acute angle to it.

In a further development of the invention, the light sources are arranged in groups, where the light sources arranged in a respective group are positioned directly next to one another. Light sources of different groups are positioned at a distance to one another that corresponds to a length of a segment of the prism reflector. Preferably, a group of light sources that can, for example, consist of three light sources are arranged in a single segment of the reflector. The length of the segment is a multiple of the length of the group of light sources. Advantageously, this will provide a relatively high luminous flux, where segments of the prism reflector can deflect the light depending on the installation space surroundings and/or the desired light signature.

In a further development of the invention, prism elements of the same reflector segment have the same orientation and/or the same design. The prism segments of different segments are not oriented the same way and/or do not have the same design. Advantageously, this can allow a light signature adjusted to the requirements to be created along an extension direction of the illuminating device.

In a further development of the invention, the light sources arranged into groups can be positioned offset to one another in such a way that a viewing angle range of the illuminating device is enlarged. The light sources are arranged offset to one another in the main extension direction such that the light emitted from the respective light sources from the same reflector segment does not deflect in the same direction, but is instead deflected in the main extension direction of the reflector or the illuminating device offset by an aspecular angle.

Sufficient luminous flux is available to create luminously intense brake or daytime running light thanks to multiple sources of lighting used to illuminate the hologram element. A rear light or positioning light function can then be achieved by dimming the light sources, as an example.

Since multiple groups are arranged in the extension direction of the illuminating device, the light function can also be made more dynamic, for example, when switching the light function on or off with a corresponding controller. If the driver of the vehicle presses the button on the key fob, the locking or unlocking of the vehicle can clearly be signaled.

In a further development of the invention, the prism elements of the reflector are designed as prism cuboids arranged in a matrix-like shape that runs in two directions perpendicular to one another and offset. The prism surfaces of the prism cuboids are calculated and arranged in relation to the position of the light sources in such a way that the required deflection and reflection of the light is achieved in the hologram element's reconstruction direction.

In a further development of the invention, the prism elements are designed to be at a right angle to the prism strips running along the prism reflector's extension direction. Advantageously, this can achieve an enlargement of the viewing angle area in the illuminating device's extension direction. Preferably, the prism strips are designed in such a way that the reflector is a plane mirror or is nearly a plane mirror. An incline of the prism strips is selected in a way that the desired lighting direction for the hologram element is achieved and ensured.

In a further development of the invention, the light sources are each respectively equipped with a funnel-shaped cover which prevents the direct light from the light sources from being cast onto the hologram element. In addition, this ensures that the light sources are not visible to the viewer from outside.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

An illuminating device for vehicles can be used to create a signal function in the front or rear area of a vehicle. In the front area, for example, a daylight running light or turn signal light function can be created. In the rear area, for example, a brake light, tail light, or position light function can be created.

Figure 1:
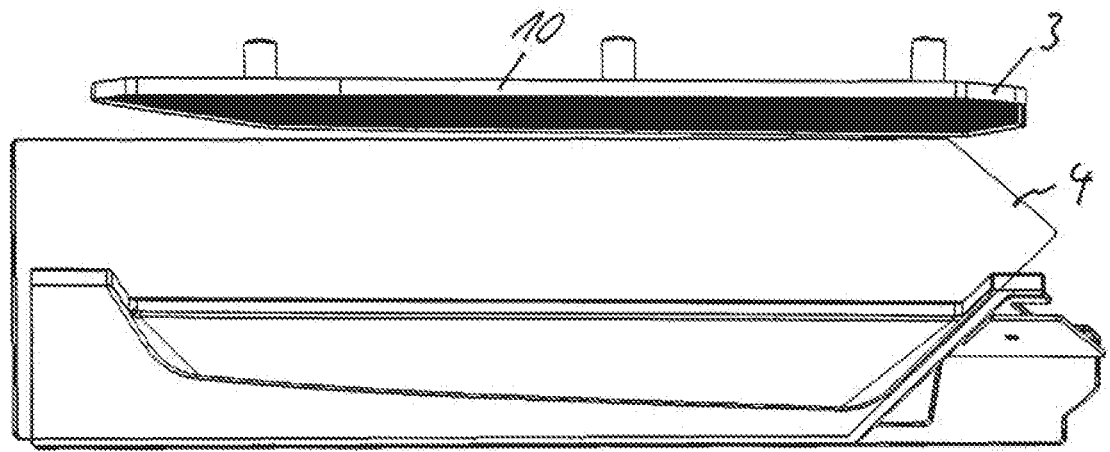
FIG. 1 is a frontal view of an illuminating device corresponding to a first embodiment.
Figure 2:
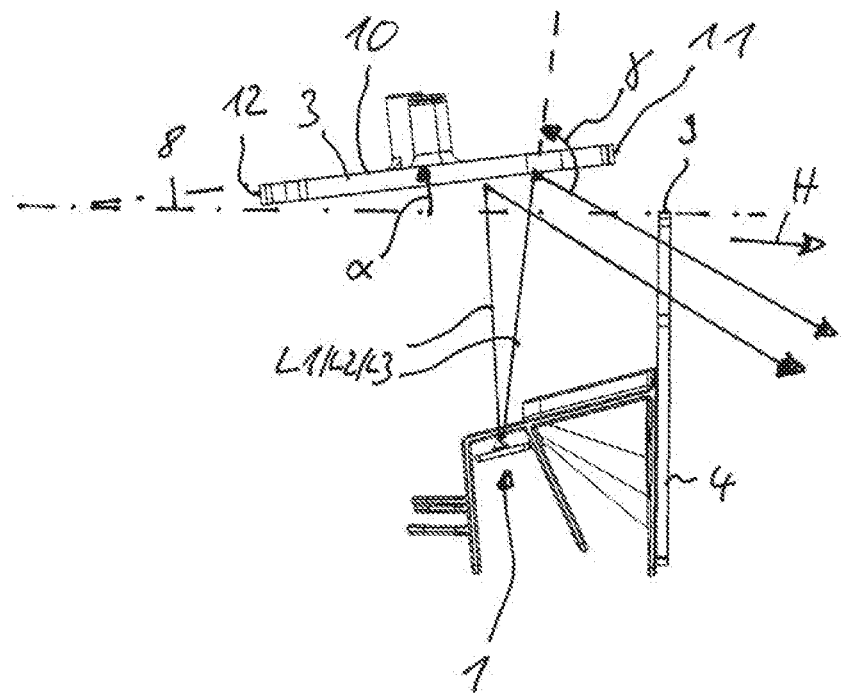
FIG. 2 is a side view of the illuminating device corresponding to FIG. 1.
Figure 3:
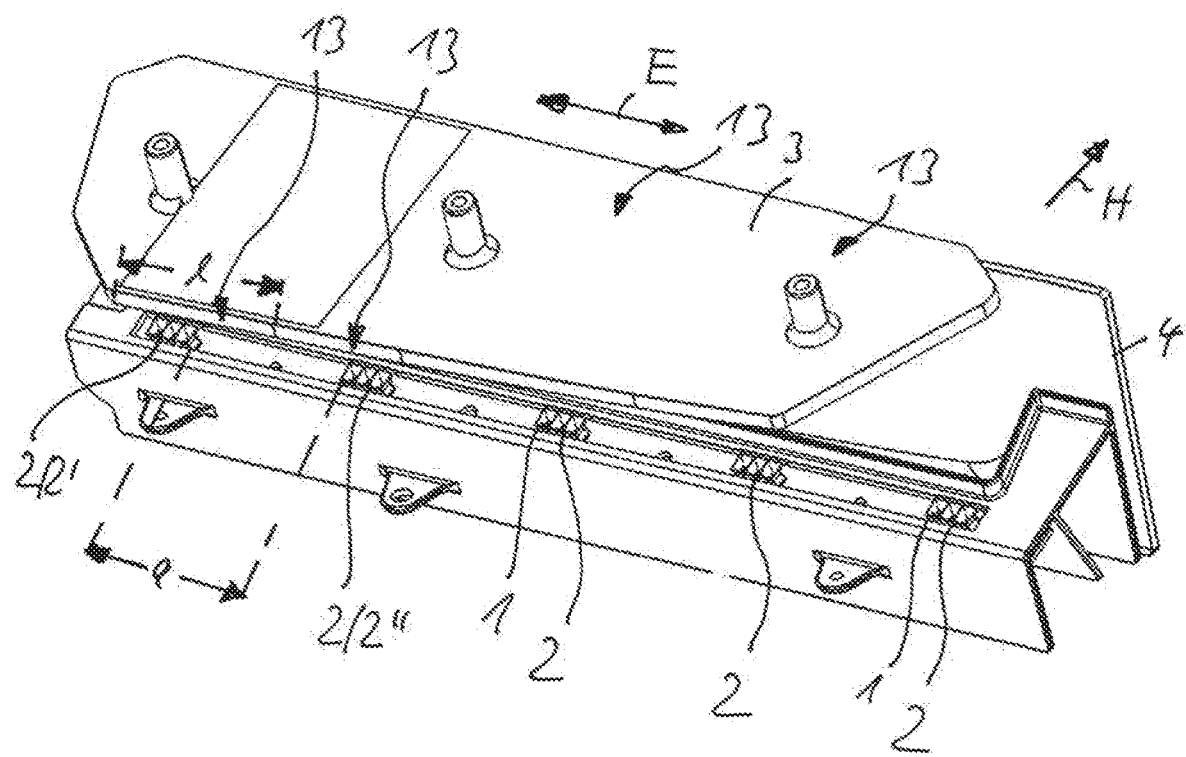
FIG. 3 is a perspective drawing of the illuminating device corresponding to FIG. 1 viewed from the rear at an angle.
Figure 4:
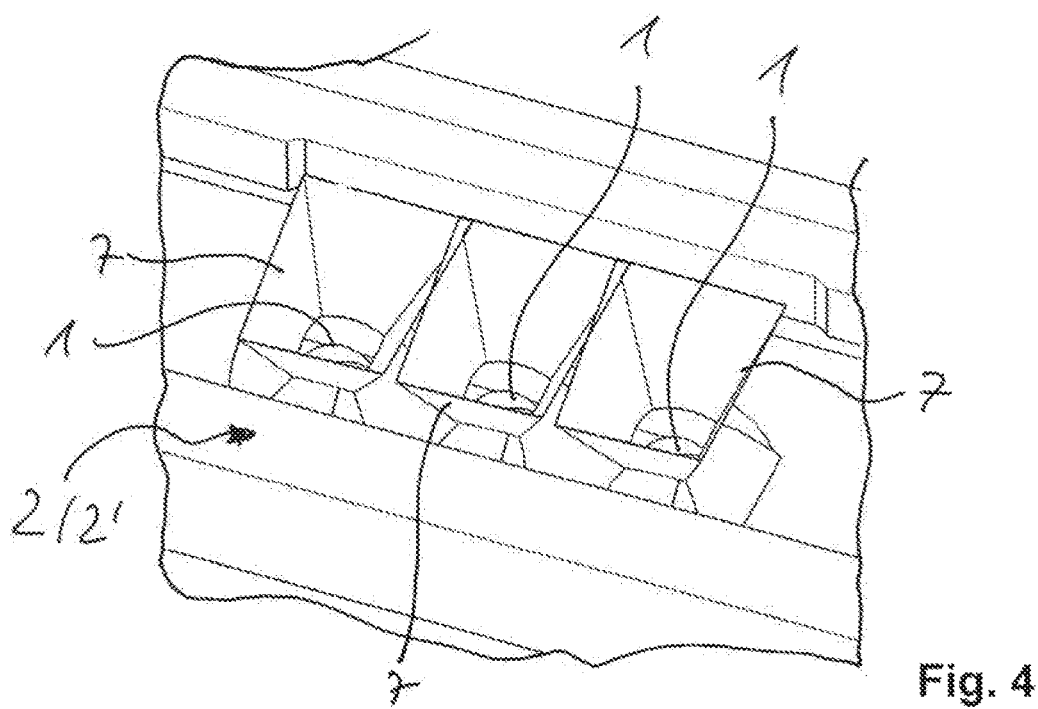
FIG. 4 is an enlarged drawing of a group of light sources that are installed in the illuminating device corresponding to FIG. 1.

In the present design example according to FIGS. 1 through 6, the illuminating device is integrated into a rear light of a vehicle, where the rear light has a bowl-shaped housing stretched horizontally, the opening of which is enclosed by a cover glass that is not shown. A multitude of light sources 1 are arranged in the lower area of the housing. The light sources 1 are arranged in groups 2, where an initial group 2' of light sources 1 are arranged at a distance a from a second group 2" of light sources 1. The light sources 1 of the same group 2, 2', 2" are arranged directly next to one another, as can be seen in FIGS. 3 and 4. The groups 2, 2', 2" of light sources 1 and the light sources 1 within groups 2, 2', 2" are arranged offset to one another in main extension direction E of the illuminating device. Advantageously, the light sources 1 run along a straight line that runs in main extension direction E.

Figure 5:
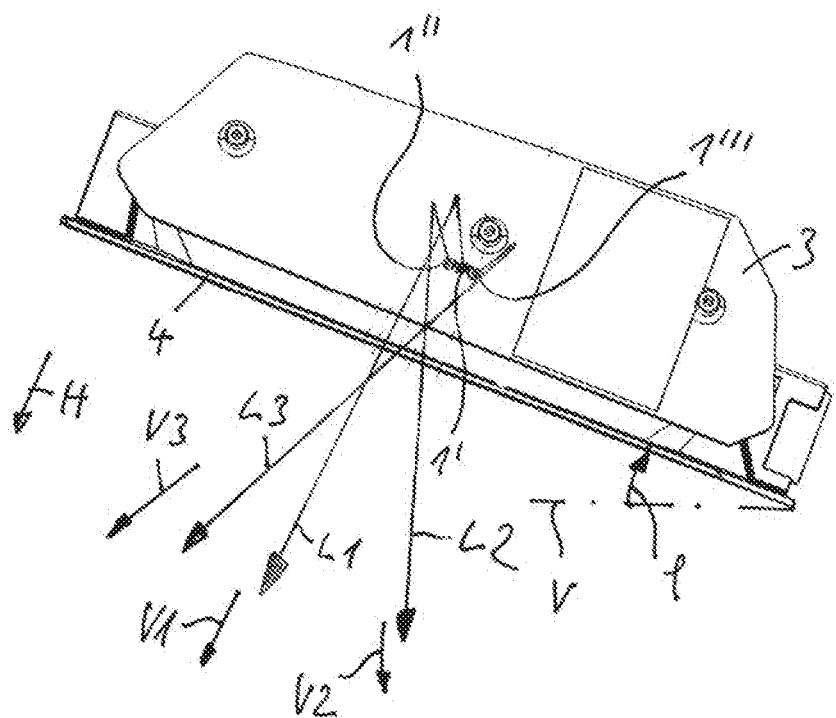
FIG. 5 is a view of the illuminating device from above corresponding to FIG. 1.

An optical unit assigned to the light sources 1 consists primarily of a reflector 3 and a hologram element 4. The reflector 3 is designed as a deflecting reflector that is arranged in an upper area of the housing. The reflector 3 is elongated and runs in main extension direction E. The main extension direction E runs primarily in a horizontal direction and at an angle of $\varphi=20°$ offset to a vertical plane V. FIG. 5 shows an illuminating device and a rear light that are arranged in the rear left area of the vehicle. It is therefore arranged extending on a side facing away from the vehicle's center axis toward the front at an angle to a side wall of the vehicle.

Figure 6:
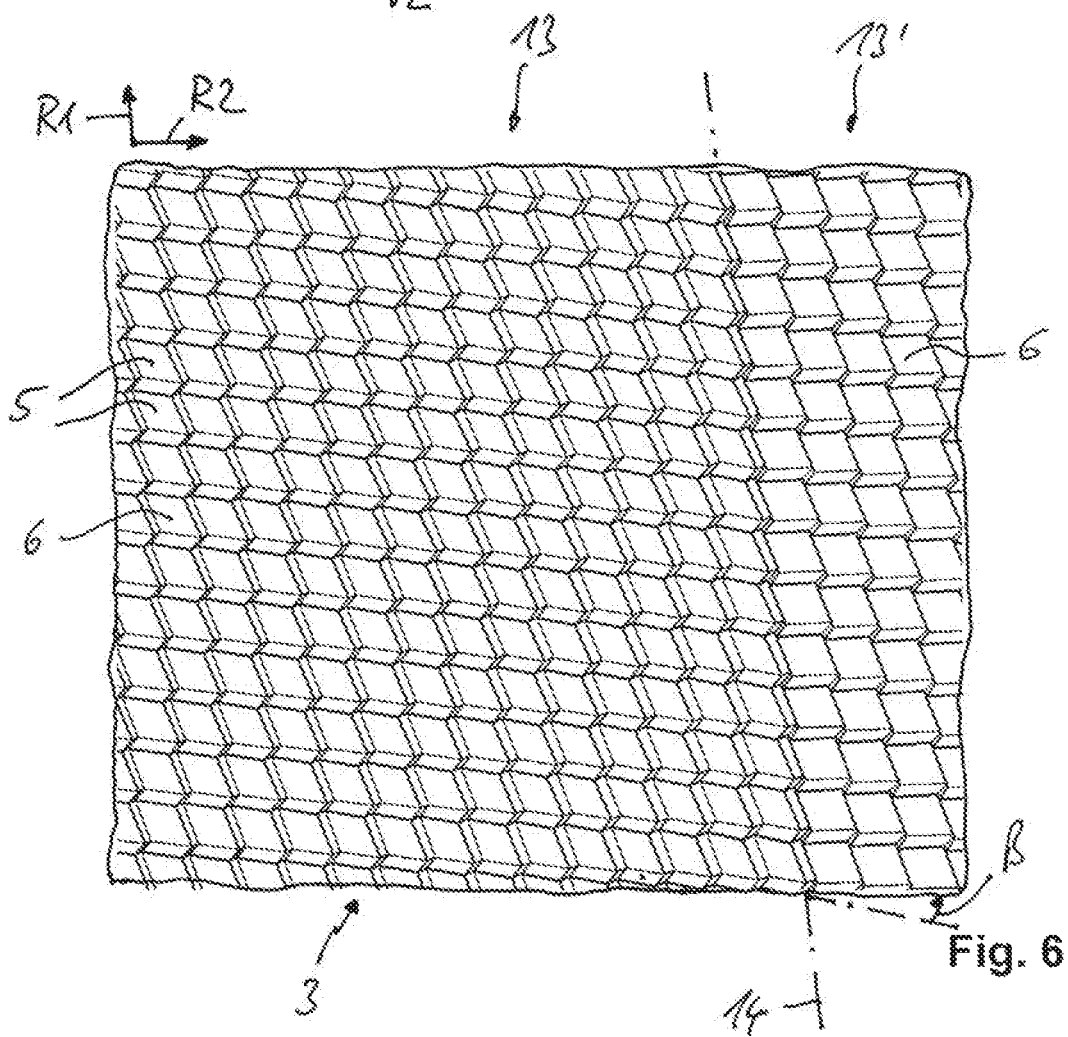
FIG. 6 is an enlarged drawing of a prism body of a reflector for the illuminating device corresponding to FIG. 1.

The reflector 5 is designed as a prism reflector that has a multitude of prism elements 5 arranged in columns and rows; see FIG. 6. The prism elements 5 are thus arranged in a matrix. The prism elements 5 are designed as prism cuboids that extend in two directions R1, R2 running offset and perpendicular to one another. The prism cuboids 5 are arranged in such a way with relation to the light sources 1 that light L1, L2, L3 from the light sources 1 is deflected in the reconstruction direction of the hologram element 4 and the desired light diffusion is created.

The prism cuboids 5 are pointing primarily in the direction of level prism surfaces 6, which run rectangularly or in a square and are separated from the neighboring prism surfaces 6 by staggering.

As can be seen in FIG. 2, the light L1, L2, L3 from the light sources 1 is emitted primarily at a right angle to main radiation direction H of the illuminating device in the direction of the prism reflector 3. Therefore, no light L1, L2, L3 emitted from the light sources 1 enters the surroundings directly without deflection; instead, all the light L1, L2, L3 emitted from the light sources 1 is deflected by prism reflector 3 at an obtuse angle $\gamma$.

To prevent light L1, L2, L3 emitted from the light sources 1 from directly hitting the hologram element 4, the light sources 1 are arranged respectively in funnel-shaped covers 7 that channel the luminous flux in such a way that the emitted light L1, L2, L3 can only hit reflector 3.

The hologram element 4 is arranged primarily at a right angle to the main radiation direction H of the illuminating device and primarily running in a vertical direction. The projected image created by hologram element 4 appears in front of or behind it in main radiation direction H in the plane of hologram element 4.

The prism reflector 3 is arranged outside of a horizontal plane 8, which crosses a glare edge 9 of the hologram element 4. Since in the above design example the prism reflector 3 is arranged in the upper area of the housing, the glare edge 9 is designed as an upper edge of hologram element 4.

If the prism reflector 3 were arranged in a lower part of the housing, then the glare edge 9 would be designed as a lower edge. The same applies if the prism reflector were to be arranged to the side, in other words, primarily in a vertical direction running along the sides of the illuminating device. Then, it would run outside of the side edges of the hologram element 4.

The prism reflector 3 has a level base 10, on which the multitude of prism elements 5 are arranged. The base 10 of the prism reflector 3 is, in the present example, inclined at an acute angle α pointing in an upward direction in relation to the main radiation direction H or to a horizontal plane. A front edge 11 of reflector 3 facing the hologram element 4 is arranged vertically higher than a rear edge 12 of the same prism reflector 3.

The distance a between groups 2, 2', 2" from the light sources 1 is selected in such a way that it corresponds to a length I from segment 13 of the prism reflector 3. As can be seen in FIG. 6, neighboring segments 13, 13' of the prism reflector 3 are arranged twisted toward each other in an acute angle β. A separating line 14 between the two segments 13, 13' runs primarily in a vertical direction. The segmentation of the reflector 3 creates an optimal adjustment of the luminous flux to the tile-shaped or flat hologram element 4, which runs roughly across the entire opening of the rear light housing. The hologram element 4 is likewise elongated in extension direction E. It is designed as a single piece.

To enlarge a viewing angle range of +/−30° or +/−35° in the horizontal direction, the light sources 1 are arranged in a group. As can be seen in FIG. 5, a center light source 1' of group 2, 2', 2" from light source 1 serves to create light L1, which is emitted in predominant direction V1. A second light source 1" is arranged on a first side in extension direction E to the first light source 1', where the same emitted light L2 is deflected by prism reflector 3 in predominant direction V2. A third source of light 1''' from the same group 2, 2' of light source 1 is arranged on a side across from the second light source 1" and immediately adjacent to the first light source 1'. The light L3 emitted from this light source 1''' is diffused primarily in a third predominant direction V3 by the prism reflector 3. In relation to predominant direction V1, predominant direction V3 runs across from predominant direction V2.

In an alternative embodiment of the invention not shown here, the prism elements 5 of different reflector segments 13, 13' can also be designed differently or aligned differently from one another.

In the present design example, the prism elements 5 of the same reflector segment 13, 13' are designed and aligned the same as one another. Prism elements 5 of different reflector segments 13, 13' are not aligned the same as one another, but are designed the same.

Figure 7:
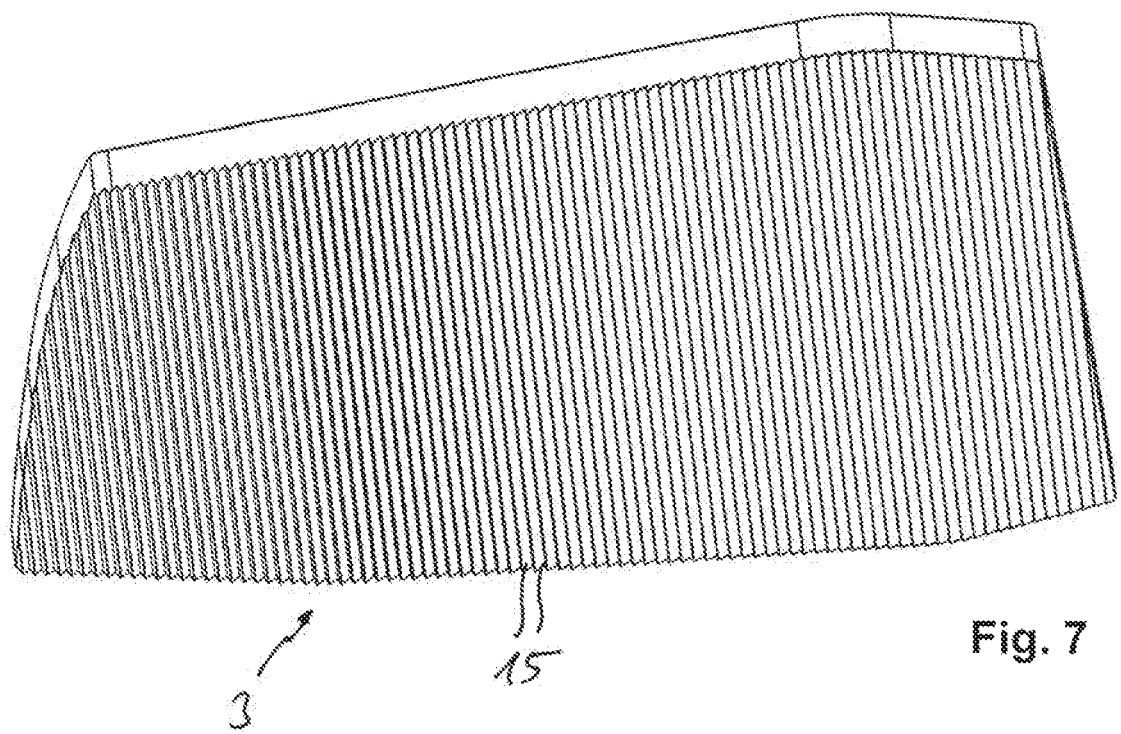
FIG. 7 is a reflector of the illuminating device corresponding to a second embodiment.
Figure 8:
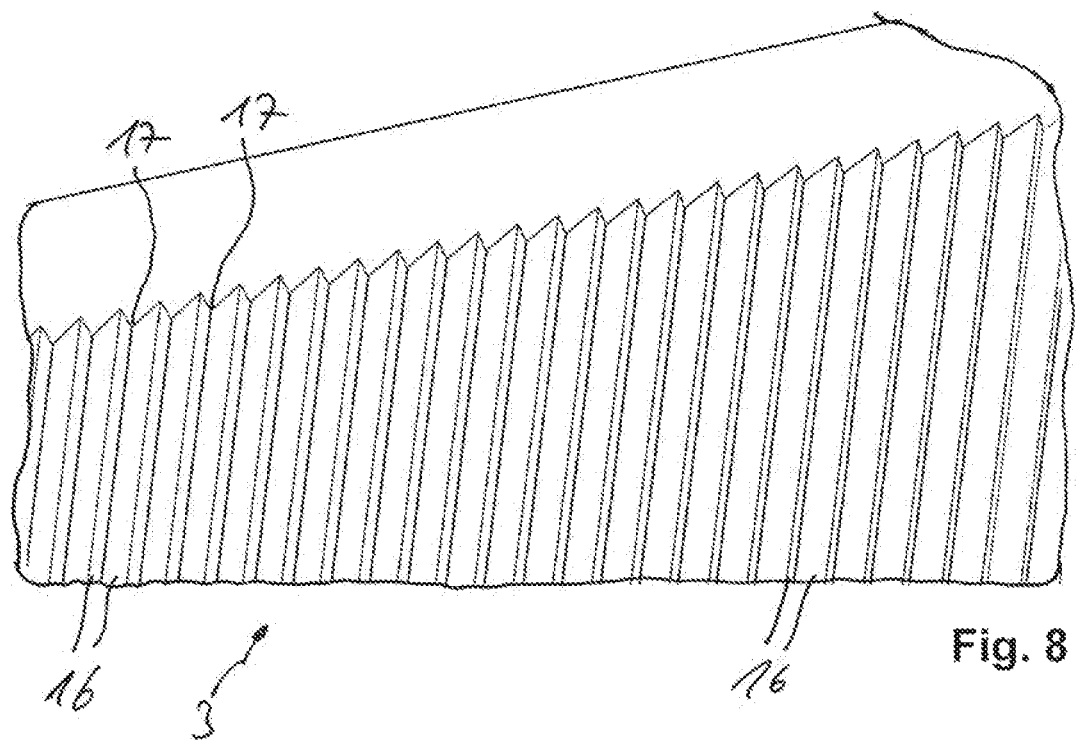
FIG. 8 is an enlarged drawing of a reflector corresponding to FIG. 7.
Figure 9:
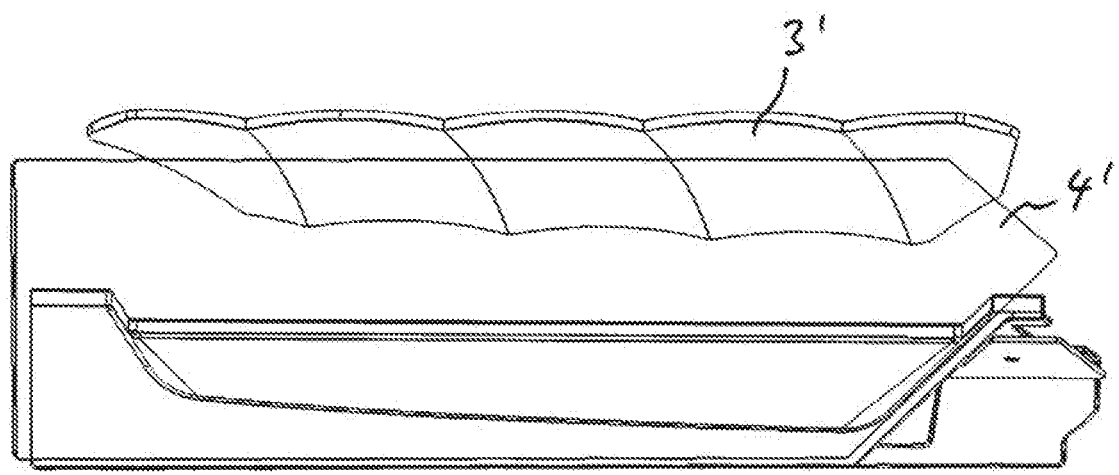
FIG. 9 is a frontal view of an illuminating device corresponding to the state of the art.

In yet another embodiment of the invention according to FIGS. 7 and 8, the prism reflector 3 has prism elements that are designed as prism strips 15. The prism strips 15 extend primarily in a vertical direction and are shaped as a triangle in cross-section. The prism strips 15 therefore also have a pair of prism surfaces 16, which likewise run primarily in a vertical direction and come together at a top line 17, which also runs vertically. The inclination of the prism surfaces 16 changes in extension direction E of the prism reflector 3, so that the light is deflected in the desired reconstruction direction of hologram element 4.

Preferably, the light L1, L2, L3 hits the hologram element 4 in parallel.

The light sources 1 can be designed as LED light sources or as laser light sources, and preferably emit white light.

LIST OF REFERENCE NUMBERS 1,1',1",1''' Light sources
2,2',2" 1st group, 2nd group
3,3' Reflector
4,4' Hologram element
5 Prism element
6 Prism surface
7 Cover
8 Horizontal plane
9 Glare edge
10 Base
11 Front edge
12 Rear edge
13,13' Segment
14 Separating line
15 Prism strips
16 Prism surface
17 Top line
V1,V2,V3 Predominant direction
E Extension level
H Main radiation
direction L1,L2,L3 Light
a Distance
l Length

The invention claimed is:

1. An illuminating device for vehicles, the illuminating device comprising:
a housing in which an optical unit with a light source, an optical unit with a reflector, and a hologram element are arranged to create a specified light diffusion, where the hologram element runs crosswise to a main radiation direction (H) of the illuminating device;
wherein the reflector is a deflecting reflector that is entirely offset by an angle (α) from a horizontal plane that separates the deflecting reflector from a glare edge of the hologram element; and
wherein the deflecting reflector is a prism reflector and has multiple prism elements arranged in columns and/or lines.

2. The illuminating device according to claim 1, wherein the prism reflector has a flat base on which most of the prism elements are arranged facing the light source.

3. The illuminating device according to claim 1, wherein the light sources are arranged as a group, where the light sources assigned to each respective group are arranged directly next to one another and where the light sources assigned to a respectively different group are arranged at a distance from one another which corresponds to a length of segments of the prism reflector.

4. The illuminating device according to claim 1, wherein the prism elements are aligned the same way toward the same reflector segments.

5. The illuminating device according to claim 1, wherein the prism elements are designed the same as different reflector segments, where bases of different reflector segments are twisted at an acute angle (β) to one another.

6. The illuminating device according to claim 3, wherein the groups of the light sources run in the main extension direction (E) of the prism reflector.

7. The illuminating device according to claim 3, wherein the light sources of a group of light sources are arranged in such a way to one another that the light emitted from the light sources of the same group is deflected by the same reflector segment in different predominant directions.

8. The illuminating device according to claim 1, wherein the prism elements are each a matrix-like prism cuboid respectively which are running offset in two directions perpendicular to one another.

9. The illuminating device according to claim 1, wherein the prism elements are in front of the main extension direction of the prism reflector on the prism strips.

10. The illuminating device according to claim 1, wherein the light sources are in the shape of a funnel-shaped cover.

* * * * *